Feb. 23, 1926.  
E. W. SAUNDERS  
1,574,310  
SPEED PEDAL LOCATING DEVICE FOR AUTOMOBILES  
Filed Dec. 15, 1924
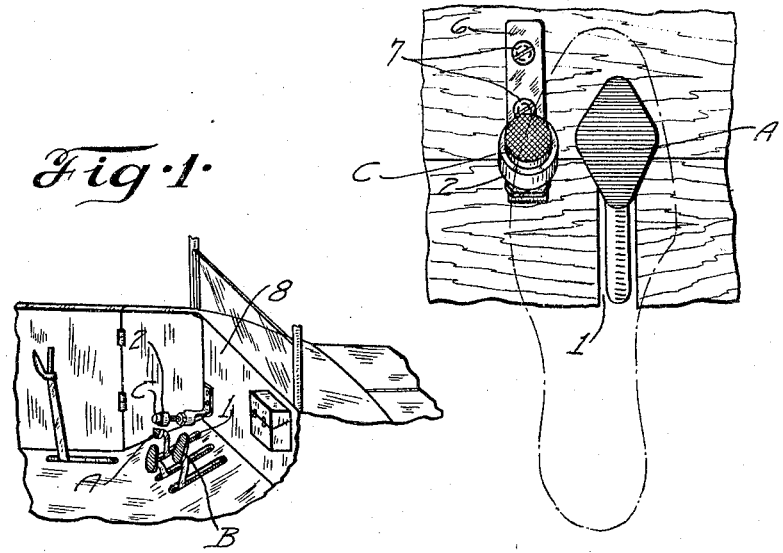
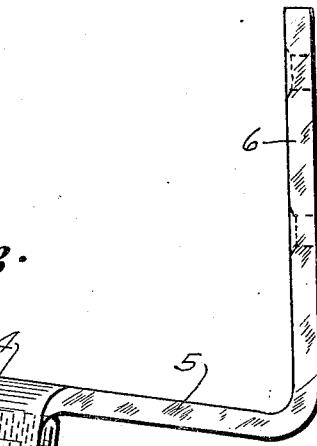
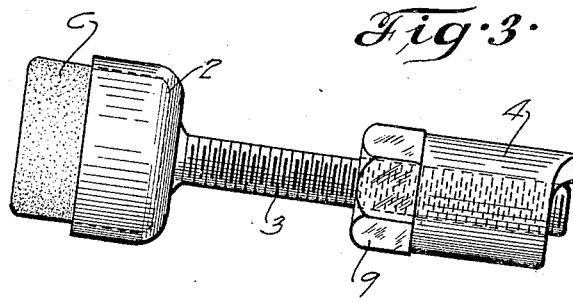
INVENTOR  
Edward W. Saunders.  
By Bakewell Church  
ATTORNEYS Patented Feb. 23, 1926.

1,574,310

UNITED STATES PATENT OFFICE.

EDWARD W. SAUNDERS, OF ST. LOUIS, MISSOURI.

SPEED-PEDAL-LOCATING DEVICE FOR AUTOMOBILES.

Application filed December 15, 1924. Serial No. 755,975.

*To all whom it may concern:*

Be it known that I, EDWARD W. SAUNDERS, a citizen of the United States, residing at St. Louis, Missouri, have invented a certain new and useful Improvement in Speed-Pedal-Locating Devices for Automobiles, of which the following is a full, clear, and exact description, such as will enable others skilled in the art to which it appertains to make and use the same.

This invention relates to devices of the kind that are used on Ford automobiles for preventing the operator from unconsciously moving the speed pedal forwardly into low speed position when said pedal should be maintained in neutral position.

The object of my invention is to provide a device of the kind referred to that is inexpensive to manufacture, easy to install and of such design that it effectively accomplishes the purpose for which it is intended without requiring the operator to trip or release an element preparatory to moving the speed pedal into low speed position.

Figure 1 of the drawings is a perspective view of a portion of a conventional Ford automobile equipped with a speed pedal locating device constructed in accordance with my invention.

Figure 2 is a top plan view of said device and the speed pedal with which it co-operates; and Figure 3 is an enlarged side elevational view of said device.

Referring to the drawings which illustrate the preferred form of my invention, A designates the speed pedal of a conventional Ford automobile that controls the transmission mechanism, which pedal has three positions, to wit, a high speed position, wherein the arm of the pedal is arranged at the rear end of the slot 1 in the floor boards of the driver's compartment up through which said pedal arm projects, a low speed position, wherein said pedal arm is arranged adjacent the front end of said slot and a neutral position intermediate the ends of said slot which said pedal arm occupies when the engine of the vehicle is disconnected from the propelling mechanism for the rear wheels.

In operating a Ford automobile there is great danger of a nervous operator or an unskilful operator pushing the speed pedal forwardly into its low speed position at a time when the operator should have kept said pedal in its neutral position. For example, in a traffic jam, when it becomes necessary to stop the vehicle suddenly, there is a natural tendency for the operator to push the speed pedal forwardly past "neutral" and into "low", on account of the fact that the stopping of the vehicle is effected by pushing forwardly on the brake pedal B, and whenever such a mistake occurs an accident is liable to ensue, due, of course, to the fact that the vehicle may continue forwardly, notwithstanding the fact that the brakes are set.

Various kinds of devices have been put on the market from time to time, with a view to remedying this inherent defect of Ford automobiles, but these prior devices have not proved entirely satisfactory from a commercial standpoint, due, in many instances, to the excessive cost of same, and in other instances to the fact that the services of a skilled mechanic was required to install them. The device which I have devised is of such simple design that is can be manufactured and sold at a sufficiently low cost to be within the reach of every user of a Ford automobile, it does not require the services of a skilled mechanic to install it, it can be adjusted to compensate for variations in the position of the speed pedal, caused by variations in the transmission bands which said pedal controls, and it is so constructed that while it effectively prevents the speed pedal from being moved unconsciously into low speed position, it does not require the operator to trip or release a separate element before pushing the speed pedal into "low".

In its simplest form my improved speed pedal locating device consists of a stop or abutment C arranged in such a position with relation to the speed pedal A that it will be engaged by the operator's shoe when the speed pedal reaches "neutral", thereby arresting the forward movement of the operator's foot and preventing the operator from unconsciously moving the speed pedal forwardly into "low". If it is desired to move the speed pedal forwardly into "low", the operator's foot which rests upon the speed pedal A is shifted transversely of said pedal far enough to clear the stop C, thus not interfering with the normal operation of the speed pedal or necessitating the tripping of a retaining element before moving the speed pedal into "low", as was necessary with some of the prior devices of this general type that have been on the market. The stop C is so constructed that it can be adjusted to line it up properly with the speed pedal A when said pedal is in "neutral" position, and said stop is so constructed that it can be installed simply by inserting a few screws or other suitable fastening devices in the dash of the driver's compartment of the vehicle, or in some other suitable stationary part of the driver's compartment in proximity to the speed pedal A.

In the form of my invention herein illustrated the abutment C consists of a buffer formed of rubber or some other suitable material mounted in a cup 2 on the upper end of an externally screw-threaded rod 3 that is screwed into a lug 4 on an arm 5 that projects rearwardly from a supporting member 6 that is adapted to be connected by screws or other suitable fastening devices 7 to the dash 8 of the vehicle, said supporting member 6 being located on the dash at such a point that the stop C will be positioned slightly to the left of the speed pedal A and in transverse alignment with the foot piece of the speed pedal A when said pedal is in "neutral". In installing the device the rod 3 is screwed into the hole in the lug 4 on the angularly-disposed arm 5 of the supporting member 6 so as to line up the stop C with the pedal A when said pedal is in "neutral", and after said stop has been properly positioned, it can be locked in adjusted position by tightening a jam nut 9 on the rod 3 which bears against one end of the lug 4, as shown in Figure 3. Such a device can be manufactured and sold at a sufficiently low cost to bring it within the reach of every user of a Ford automobile, it does not require the services of a mechanic to install it and it can be adjusted easily to compensate for variations in the position of the speed pedal of a Ford automobile caused by variations in the transmission bands.

Having thus described my invention, what I claim as new and desire to secure by Letters Patent is:

A device for the purpose described, consisting of a supporting member adapted to be connected to the dash of an automobile, an angularly-disposed arm projecting rearwardly from said member and provided with an internally screw-threaded lug, a rod screwed into said lug and provided at its outer end with a cup, a buffer mounted in said cup, and a jam nut on said rod for preventing said rod from turning accidentally with relation to said lug.

EDWARD W. SAUNDERS.